(12) United States Patent
Fukuda

(10) Patent No.: US 7,828,483 B2
(45) Date of Patent: Nov. 9, 2010

(54) ANGULAR CONTACT BALL BEARING

(75) Inventor: Toshirou Fukuda, Nara (JP)

(73) Assignee: JTEKT Corporation, Osaka-shi, Osaka (JP)

(*) Notice: Subject to any disclaimer, the term of this patent is extended or adjusted under 35 U.S.C. 154(b) by 613 days.

(21) Appl. No.: 11/882,856

(22) Filed: Aug. 6, 2007

(65) Prior Publication Data
US 2008/0031560 A1 Feb. 7, 2008

(30) Foreign Application Priority Data
Aug. 7, 2006 (JP) ............................ P2006-214474
Aug. 7, 2006 (JP) ............................ P2006-214489

(51) Int. Cl.
F16C 41/04 (2006.01)
F16C 33/58 (2006.01)
F16C 33/46 (2006.01)

(52) U.S. Cl. .................. 384/523; 384/448; 384/513

(58) Field of Classification Search .............. 384/513, 384/523, 448, 528, 510
See application file for complete search history.

(56) References Cited

U.S. PATENT DOCUMENTS 4,722,617 A * 2/1988 Stella et al. ............. 384/523
5,906,441 A 5/1999 Seki

FOREIGN PATENT DOCUMENTS

| DE | 39 02 314 A1 | 8/1989 |
|----|--------------|--------|
| EP | 1 574 729 A1 | 9/2005 |
| FR | 2 798 708 A1 | 3/2001 |
| JP | 2004-052785 | 2/2004 |
| JP | 2005-61508 | 3/2005 |

OTHER PUBLICATIONS

European Search Report dated Dec. 20, 2007.
European Search Report dated May 28, 2008.

* cited by examiner

Primary Examiner—Thomas R Hannon
(74) Attorney, Agent, or Firm—McGinn IP Law Group, PLLC

(57) ABSTRACT

An upper surface of an outer ring is disposed axially inwardly of an end surface of a larger-diameter annular portion of a cage, and an outer diameter of the end surface of the larger-diameter annular portion of the cage is larger than an inner diameter of a lower surface of the outer ring. Chamfered portions for facilitating the taking-out of an outer ring assembly from the lower side of a stack of outer ring assemblies are formed respectively at the end surface of the larger-diameter annular portion of the cage and the lower surface of the outer ring.

2 Claims, 6 Drawing Sheets

US 7,828,483 B2

1

ANGULAR CONTACT BALL BEARING

BACKGROUND OF THE INVENTION

This invention relates to an angular contact ball bearing, and more particularly to an angular contact ball bearing combined with a conical type cage.

An angular contact ball bearing, comprising an inner ring, an outer ring, a plurality of balls disposed between the two rings and a cage holding these balls, is well known. JP-A-2004-52785 Publication discloses a cage called a conical type which can be used as the cage of this angular contact ball bearing. A combination of this conical type cage and the angular contact ball bearing has been extensively used as a preferred form.

Various rolling bearings have been required to have a lightweight design, and with respect to an angular contact ball bearing, it may be proposed to achieve its lightweight design by reducing an axial dimension of an outer ring and/or an inner ring. On the other hand, in a process of assembling angular contact ball bearings, these bearings are often stacked together in an outer ring assembled state or an inner ring-assembled state, and thereafter an outer ring assembly or an inner ring assembly is pulled or taken out from the lower side of the stack.

FIG. 7 shows a condition in which outer ring assemblies 36A, 36B of angular contact ball bearings of a lightweight design are stacked together (Here, only two tiers are shown), each of the outer ring assemblies having balls 34 and a conical type cage 35 incorporated in an outer ring 32. The conical type cage 35 includes a larger-diameter annular portion 38, a smaller-diameter annular portion 39 spaced a predetermined distance from the annular portion 38 in an axial direction, and a plurality of inclined pillar portions 40 arranged at predetermined intervals in the circumferential direction and interconnecting the two annular portions 38 and 39. The cage 35 has a plurality of pockets 41 for respectively receiving the balls 34, each pocket 41 being defined by two adjacent pillar portions 40 and those portions of the two annular portions 38 and 39 extending between these two pillar portions 40.

In the angular contact ball bearings shown in FIG. 7, when the outer ring assembly 36A is to be pulled out from the lower side of the stack of outer ring assemblies 36A and 36B, there is encountered a problem that the lower ring assembly 36A can not be pulled out since the larger-diameter annular portion 38 of the cage 35 of the lower outer ring assembly 36A is fitted in the bore (or inner periphery) of the outer ring 32 of the upper outer ring assembly 36B. Although not shown in the drawings, the same problem is encountered with a stack of inner ring assemblies.

FIG. 8 shows a portion of another related angular contact ball bearing.

In FIG. 8, the angular contact ball bearing 131 comprises an outer ring 132 having a raceway surface 132a formed on its inner periphery, an inner ring 133 having a raceway surface 133a formed on its outer periphery, a plurality of balls 134 disposed between the two rings 132 and 133 and arranged at predetermined intervals in a circumferential direction, and a conical type cage 135 holding these balls 134.

The cage 135 includes a larger-diameter annular portion 138, a smaller-diameter annular portion 139 spaced a predetermined distance from the annular portion 138 in an axial direction, and a plurality of inclined pillar portions 140 arranged at predetermined intervals in the circumferential direction and interconnecting the two annular portions 138 and 139. The cage 135 has a plurality of pockets 141 for respectively receiving the balls 134, each pocket 141 being

2 defined by two adjacent pillar portions 140 and those portions of the two annular portions 138 and 139 extending between these two pillar portions 140.

One end surface (upper end surface) of the outer ring 132 is disposed axially inwardly of (below) an end surface of the larger-diameter annular portion 138 of the cage 135, and one end surface (lower end surface) of the inner ring 133 is disposed axially inwardly of an end surface of the smaller-diameter annular portion 139 of the cage 135. With this construction, a lightweight design of the angular contact ball bearing 131 is achieved.

The angular contact ball bearings 131 are often stacked in a multi-tier manner in an outer ring assembled state in which the balls 134 and the cage 135 are incorporated in the outer ring 132, and the thus stacked angular contact ball bearings 131 are stored and conveyed. Also, the angular contact ball bearings 131 are often stacked together in an inner ring assembled state in which the balls 134 and the cage 135 are incorporated in the inner ring 133, and the thus stacked angular contact ball bearings 131 are stored and conveyed.

FIG. 9 shows a condition in which outer ring assemblies 136A, 136B of the angular contact ball bearings 131 of FIG. 8 are stacked together (Here, only two tiers are shown). In the lowermost outer ring assembly 136A, the lower end surface of the outer ring 132 is held in contact with a placing surface such as a conveyance bed, and a gap is formed between the end surface (lower end surface) of the smaller-diameter annular portion 139 of the cage 135 and the placing surface. In the upper outer ring assembly 136B, the lower end surface of the outer ring 132 is held in contact with the end surface (upper end surface) of the larger-diameter annular portion 138 of the cage 135 of the lower outer ring assembly 136A, and the cages 135 of the adjacent outer ring assemblies 136A and 136B are not contacted with each other.

When the outer ring assemblies 136A and 136B are stacked as shown in FIG. 9, the upper outer ring assembly 136B is placed on the cage 135 of the lower outer ring assembly 136A, and a large load acts between the balls 134 and the raceway surface 132a of the outer ring 132 of the lower outer ring assembly 136A. As a result, when an impact load is applied during conveyance, there is a possibility that brinelling (indentation) and damage occur on the raceway surface 132a of the outer ring 132.

SUMMARY OF THE INVENTION

It is an object of this invention to provide an angular contact ball bearing employing a conical type cage, in which a lightweight design is achieved by reducing an axial dimension of an outer ring and/or an inner ring, and also the ability of taking an outer ring- or an inner ring-assembly out from the lower side of a stack of ring assemblies is prevented from being lowered.

Further, there is encountered a problem that the above method of achieving the lightweight design by reducing the axial dimension of the outer ring and/or the inner ring adversely affects the ability of stacking the angular contact ball bearings each employing a conical type cage.

According to a first aspect of the present invention, there is provided an angular contact ball bearing comprising an outer ring, an inner ring, a plurality of balls disposed between the outer and inner rings, and a cage holding the balls, wherein the cage has one end surface and the other end surface which are different in diameter, and the angular contact ball bearings are stacked in an outer ring assembled state in which the balls and the cage are incorporated in the outer ring; characterized in that one end surface of the outer ring is disposed axially inwardly of the larger-diameter end surface of the cage; and an outer diameter of the larger-diameter end surface of the cage is larger than an inner diameter of the other end surface of the outer ring; and a chamfered portion for facilitating the taking-out of the outer ring assembly from the lower side of a stack of outer ring assemblies is formed at at least one of a corner portion of the larger-diameter end surface of the cage and a corner portion of the other end surface of the outer ring.

According to a second aspect of the invention, there is provided an angular contact ball bearing comprising an outer ring, an inner ring, a plurality of balls disposed between the outer and inner rings, and a cage holding the balls, wherein the cage has one end surface and the other end surface which are different in diameter, and the angular contact ball bearings are stacked in an inner ring assembled state in which the balls and the cage are incorporated in the inner ring; characterized in that one end surface of the inner ring is disposed axially inwardly of the smaller-diameter end surface of the cage; and an inner diameter of the smaller-diameter end surface of the cage is smaller than an outer diameter of the other end surface of the inner ring; and a chamfered portion for facilitating the taking-out of the inner ring assembly from the lower side of a stack of inner ring assemblies is formed at at least one of a corner portion of the smaller-diameter end surface of the cage and a corner portion of the other end surface of the inner ring.

A cage having opposite end surfaces different in diameter is called a conical type cage, and includes a larger-diameter annular portion, a smaller-diameter annular portion spaced a predetermined distance from the larger-diameter annular portion in an axial direction, and a plurality of inclined pillar portions arranged at predetermined intervals in the circumferential direction and interconnecting the two annular portions. In an angular contact ball bearing employing this cage, an axial dimension of an outer ring is reduced (in which case one end surface of the outer ring is disposed axially inwardly of the end surface of the cage) or an axial dimension of an inner ring is reduced (in which case one end surface of the inner ring is disposed axially inwardly of the end surface of the cage) in order to achieve a lightweight design. When outer ring assemblies (each of which is a preassembly in which balls are mounted on a raceway surface of the outer ring, and are retained by the cage against disengagement from this raceway surface) or inner ring assemblies (each of which is a preassembly in which the balls are mounted on a raceway surface of the inner ring, and are retained by the cage against disengagement from this raceway surface) are stacked together, and thereafter the ring assemblies are sequentially taken out from the lower side of the stack, there is encountered a problem that the larger-diameter annular portion of the cage fits in a gap between the inner periphery of the outer ring and the smaller-diameter annular portion of the cage, so that the ring assembly can not be easily pulled out.

In the angular contact ball bearing according to the first aspect of the invention, the ability of taking the outer ring assembly out from the lower side of the stack of outer ring assemblies is enhanced. The outer diameter of the larger-diameter end surface of the cage is larger than the inner diameter of the other end surface of the outer ring, and with this construction the larger-diameter annular portion of the cage is prevented from fitting in the gap between the inner periphery of the outer ring and the smaller-diameter annular portion of the cage. And besides, the chamfered portion is formed at at least one of the corner portion of the larger-diameter end surface of the cage and the corner portion of the other end surface of the outer ring, and this facilitates the taking-out of the outer ring assembly from the lower side of the stack of outer ring assemblies.

Incidentally, one end of the outer ring is made larger in diameter than the other end thereof by forming a counter bore in the one end. The counter bore opposite side end surface of the outer ring is flush with the smaller-diameter end surface of the cage in a stacked condition. These end surfaces flush with each other serve as a lower surface in a stacked condition. For disposing the counter bore opposite side end surface of the outer ring and the smaller-diameter end surface of the cage flush with each other in a stacked condition, the smaller-diameter end portion of the cage may be thickened, or the center of each ball may be disposed axially closer to the counter bore opposite side end surface of the outer ring. For making the outer diameter of the larger-diameter end surface of the cage larger than the inner diameter of the other end surface (counter bore opposite side end surface) of the outer ring, the outer diameter of the larger-diameter end surface of the cage may be made larger than a basic dimension, or the inner diameter of the other end surface of the outer ring may be made smaller than a basic dimension. Preferably, chamfered portions are formed respectively at the corner portion of the larger-diameter end surface of the cage and the corner portion of the other end surface of the outer ring. Preferably, the chamfered portion is made as large as possible within the range of a half (superposition area) of the dimensional difference between the outer diameter of the larger-diameter end surface of the cage and the inner diameter of the other end surface of the outer ring.

In the angular contact ball bearing according to the second aspect of the invention, the ability of taking the inner ring assembly out from the lower side of the stack of inner ring assemblies is enhanced. The inner diameter of the smaller-diameter end surface of the cage is smaller than the outer diameter of the other end surface of the inner ring, and with this construction the smaller-diameter annular portion of the cage is prevented from fitting in a gap between the outer periphery of the inner ring and the larger-diameter annular portion of the cage. And besides, the chamfered portion is formed at at least one of the corner portion of the smaller-diameter end surface of the cage and the corner portion of the other end surface of the inner ring, and this facilitates the taking-out of the inner ring assembly from the lower side of the stack of inner ring assemblies.

Incidentally, one end of the inner ring is made smaller in diameter than the other end thereof by forming a counter bore in the one end. The counter bore opposite side end surface of the inner ring is flush with the larger-diameter end surface of the cage in a stacked condition. These end surfaces flush with each other serve as a lower surface in a stacked condition. For disposing the counter bore opposite side end surface of the inner ring and the larger-diameter end surface of the cage flush with each other in a stacked condition, the larger-diameter end portion of the cage may be thickened, or the center of each ball may be disposed axially closer to the counter bore opposite side end surface of the inner ring. For making the inner diameter of the smaller-diameter end surface of the cage smaller than the outer diameter of the other end surface (counter bore opposite side end surface) of the inner ring, the inner diameter of the smaller-diameter end surface of the cage may be made smaller than a basic dimension, or the outer diameter of the other end surface of the inner ring may be made larger than a basic dimension. Preferably, chamfered portions are formed respectively at the corner portion of the smaller-diameter end surface of the cage and the corner portion of the other end surface of the inner ring. Preferably, the chamfered portion is made as large as possible within the range of a half (superposition area) of the dimensional difference between the outer diameter of the other end surface of the inner ring and the inner diameter of the smaller-diameter end surface of the cage.

The angular contact ball bearing is not limited to any specified type (such as an outer ring separable type, an inner-outer ring separable type, etc.) in so far as it can be held in an outer ring- or an inner ring-assembled state in a single row form. Furthermore, materials for the outer ring, the inner ring and the balls are not limited. The cage is formed, for example, by injection molding a synthetic resin such as polyamide or PEEK, and its material and a method of molding it are not limited.

In the angular contact ball bearings of the present invention, the lightweight design can be achieved by reducing the axial dimension of the outer ring or the inner ring, and also the ability of taking the outer ring assembly or the inner ring assembly out from the lower side of the stack of ring assemblies which may be adversely affected by this lightweight design is maintained by the difference in diameter between the cage and the outer ring or the inner ring at their superposition surfaces and also by the formation of the chamfered portions at the corner portions of the superposition surfaces.

According to a third aspect of the present invention, there is provided an angular contact ball bearing comprising an outer ring, an inner ring, a plurality of balls disposed between the outer and inner rings, and a cage holding the balls, wherein the cage has one end surface and the other end surface which are different in diameter, and the angular contact ball bearings are stacked in an outer ring assembled state in which the balls and the cage are incorporated in the outer ring, and are stored and conveyed; characterized in that one end surface of the outer ring is disposed axially inwardly of the larger-diameter end surface of the cage; and when the outer ring assembly is disposed with the other end surface of the outer ring directed downward, the other end surface of the outer ring and the smaller-diameter end surface of the cage are disposed flush with each other; and a plurality of protruding portions are formed on one of that portion of an inner peripheral surface of the cage adjacent to the larger-diameter end surface thereof and that portion of an outer peripheral surface of the cage adjacent to the smaller-diameter end surface thereof, and are arranged at predetermined intervals, and when the outer ring assemblies are stacked together, the plurality of protruding portions abut against the end surface of the cage of the adjacent outer ring assembly.

According to a fourth aspect of the invention, there is provided an angular contact ball bearing comprising an outer ring, an inner ring, a plurality of balls disposed between the outer and inner rings, and a cage holding the balls, wherein the cage has one end surface and the other end surface which are different in diameter, and the angular contact ball bearings are stacked in an inner ring assembled state in which the balls and the cage are incorporated in the inner ring, and are stored and conveyed; characterized in that one end surface of the inner ring is disposed axially inwardly of the smaller-diameter end surface of the cage; and when the inner ring assembly is disposed with the other end surface of the inner ring directed downward, the other end surface of the inner ring and the larger-diameter end surface of the cage are disposed flush with each other; and a plurality of protruding portions are formed on one of that portion of an inner peripheral surface of the cage adjacent to the larger-diameter end surface thereof and that portion of an outer peripheral surface of the cage adjacent to the smaller-diameter end surface thereof, and are arranged at predetermined intervals, and when the inner ring assemblies are stacked together, the plurality of protruding portions abut against the end surface of the cage of the adjacent inner ring assembly.

A cage having opposite end surfaces different in diameter is called a conical type cage, and includes a larger-diameter annular portion, a smaller-diameter annular portion spaced a predetermined distance from the larger-diameter annular portion in an axial direction, and a plurality of inclined pillar portions arranged at predetermined intervals in the circumferential direction and interconnecting the two annular portions. In an angular contact ball bearing employing this cage, an axial dimension of an outer ring is reduced (in which case one end surface of the outer ring is disposed axially inwardly of the end surface of the cage) or an axial dimension of an inner ring is reduced (in which case one end surface of the inner ring is disposed axially inwardly of the end surface of the cage) in order to achieve a lightweight design. When outer ring assemblies (each of which is a preassembly in which balls are mounted on a raceway surface of the outer ring, and are retained by the cage against disengagement from this raceway surface) or inner ring assemblies (each of which is a preassembly in which the balls are mounted on a raceway surface of the inner ring, and are retained by the cage against disengagement from this raceway surface) are stacked together, it is possible that there arises a problem that because of the difference in diameter between the annular portions of the adjacent cages in a plane in which the adjacent ring assemblies are mated with each other, the dead weight deforms the cage of the lower outer ring assembly or the lower inner ring assembly in a stacked condition, thus forming brinelling (indentation) between the balls and the outer ring or between the balls and the inner ring.

In the angular contact ball bearing according to the third aspect of the invention, the ability of stacking the outer ring assemblies is enhanced, and one end of the outer ring is made larger in diameter than the other end thereof by forming a counter bore in the one end. The counter bore opposite side end surface of the outer ring is flush with the smaller-diameter end surface of the cage. These end surfaces flush with each other serve as a lower surface in a stacked condition. Here, the term "flush" does not mean that the two surfaces are flush with each other during the operation of the bearing, but means that the other end surface of the outer ring and the smaller-diameter end surface of the cage are flush with each other when the outer ring assembly is disposed with the other end surface of the outer ring directed downward as described above. For forming the outer ring assembly, the balls are fitted to the cage from the outer periphery thereof, and in view of the efficiency of this fitting operation, the protruding portions are preferably formed on the portion of the inner peripheral surface of the cage adjacent to the larger-diameter end surface thereof. For disposing the counter bore opposite side end surface of the outer ring and the smaller-diameter end surface of the cage flush with each other, the smaller-diameter end portion of the cage may be thickened, or the center of each ball may be disposed axially closer to the counter bore opposite side end surface of the outer ring.

In the angular contact ball bearing according to the fourth aspect of the invention, the ability of stacking the inner ring assemblies is enhanced, and one end of the inner ring is made smaller in diameter than the other end thereof by forming a counter bore in the one end. The counter bore opposite side end surface of the inner ring is flush with the larger-diameter end surface of the cage. These end surfaces flush with each other serve as a lower surface in a stacked condition. Here, the term "flush" does not mean that the two surfaces are flush with each other during the operation of the bearing, but means that the other end surface of the inner ring and the larger-diameter end surface of the cage are flush with each other when the inner ring assembly is disposed with the other end surface of the inner ring directed downward as described above. For forming the inner ring assembly, the balls are fitted to the cage from the inner periphery thereof, and in view of the efficiency of this fitting operation, the protruding portions are preferably formed on the portion of the outer peripheral surface of the cage adjacent to the smaller-diameter end surface thereof. For disposing the counter bore opposite side end surface of the inner ring and the larger-diameter end surface of the cage flush with each other, the larger-diameter end portion of the cage may be thickened, or the center of each ball may be disposed axially closer to the counter bore opposite side end surface of the inner ring.

The angular contact ball bearing is not limited to any specified type (such as an outer ring separable type, an inner-outer ring separable type, etc.) in so far as it can be held in an outer ring- or an inner ring-assembled state in a single row form. Furthermore, materials for the outer ring, the inner ring and the balls are not limited. The cage is formed, for example, by injection molding a synthetic resin such as polyamide or PEEK, and its material and a method of molding it are not limited.

In the angular contact ball bearings of the present invention, the lightweight design can be achieved by reducing the axial dimension of the outer ring or the inner ring, and also the ability of stacking the outer ring assemblies or the inner ring assemblies which may be adversely affected by this lightweight design is maintained by the formation of the protruding portions on the cage.

DETAILED DESCRIPTION OF PREFERRED EMBODIMENTS

Figure 1:
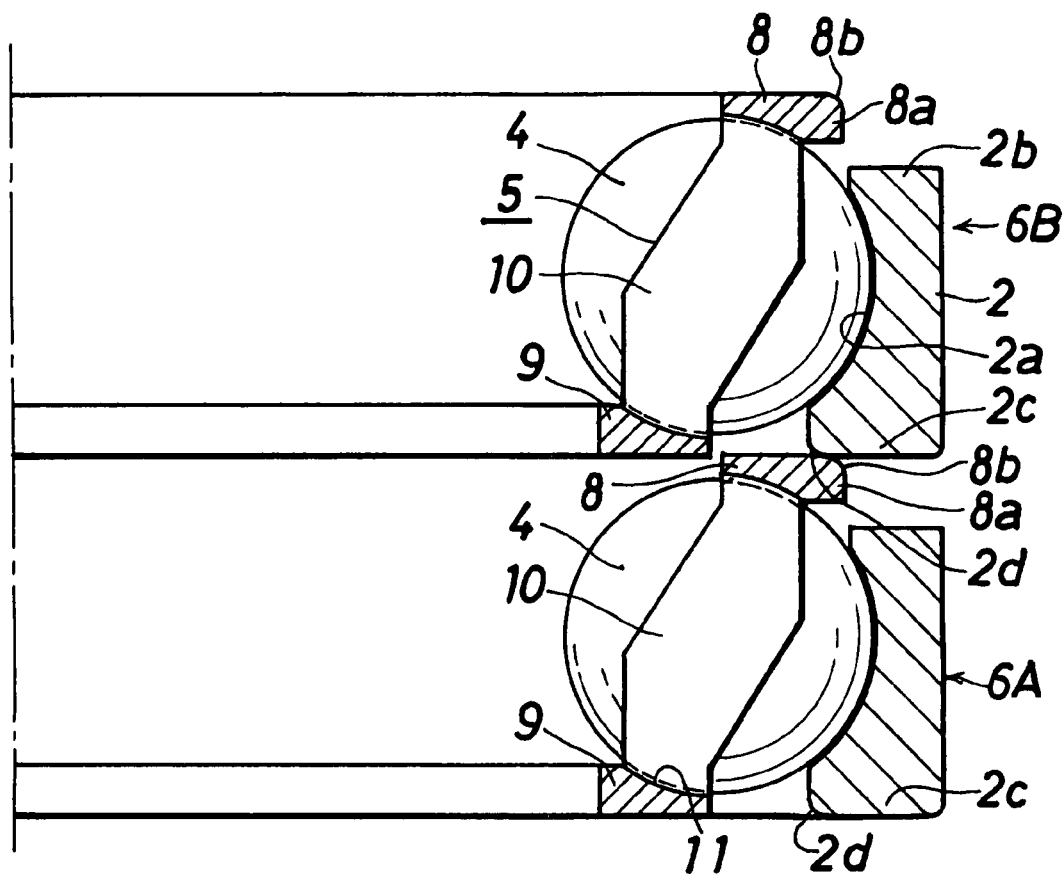
FIG. 1 is a vertical cross-sectional view showing a first embodiment of angular contact ball bearings of the present invention.

A preferred embodiment of the present invention will now be described with reference to the drawings, and in the following description the terms "upper and lower" mean the upper and lower sides in the drawings.

First Embodiment

FIG. 1 shows angular contact ball bearings according to a first embodiment of the invention. The angular contact ball bearing includes a conical type cage 5, and this cage 5 includes a larger-diameter annular portion 8, a smaller-diameter annular portion 9 spaced a predetermined distance from the annular portion 8 in an axial direction, and a plurality of inclined pillar portions 10 arranged at predetermined intervals in the circumferential direction and interconnecting the two annular portions 8 and 9. In order that a lightweight design can be achieved and also that outer ring assemblies 6A and 6B (each having balls 4 and the conical type cage 5 incorporated in an outer ring 2) of the angular contact ball bearings can be suitably stacked together, one end surface (upper end surface) of the outer ring 2 is disposed axially inwardly of (below) an end surface of the larger-diameter annular portion 8 of the cage 5, and the other end surface (lower end surface) of the outer ring 2 is disposed flush with an end surface (lower end surface) of the smaller-diameter annular portion 9 of the cage 5 in a stacked condition. An outer diameter of the larger-diameter annular portion 8 of the cage 5 is larger than an inner diameter of the lower end surface of the outer ring 2, and with this construction when the outer ring assemblies 6A and 6B are stacked together, an area of superposition corresponding to a half of the dimensional difference between the outer diameter of the larger-diameter annular portion 8 of the cage 5 and the inner diameter of the lower end surface of the outer ring 2 is formed between the end surface of the larger-diameter annular portion 8 of the cage 5 (of the lower outer ring assembly 6A) and the lower end surface of the outer ring 2 (of the upper outer ring assembly 6B) which are superposed together. Further, a chamfered portion 8b is formed at a corner portion (outer edge portion) of the end surface of the larger-diameter annular portion 8 of the cage 5, and also a chamfered portion 2d is formed at a corner portion (inner edge portion) of the lower end surface of the outer ring 2. These chamfered portions 8b and 2d facilitate the taking-out of the outer ring assembly from the lower side of the stack of outer ring assemblies.

In FIG. 1, each of the outer ring assemblies 6A and 6B is assembled such that the balls 4 are mounted on a raceway surface 2a of the outer ring 2, and are retained by the cage 5 against disengagement from the raceway surface 2a. The balls 4 are fitted respectively in pockets 11 of the cage 5, and are prevented from withdrawal from the respective pockets 11.

The raceway surface 2a of the outer ring 2 is formed into a so-called counter bore type, and a diameter of an end portion (counter bore side end portion) 2b corresponding to the larger-diameter annular portion 8 of the cage 5 is larger than a diameter of an end portion (counter bore opposite side end portion) 2c corresponding to the smaller-diameter annular portion 9 of the cage 5.

Figure 7:
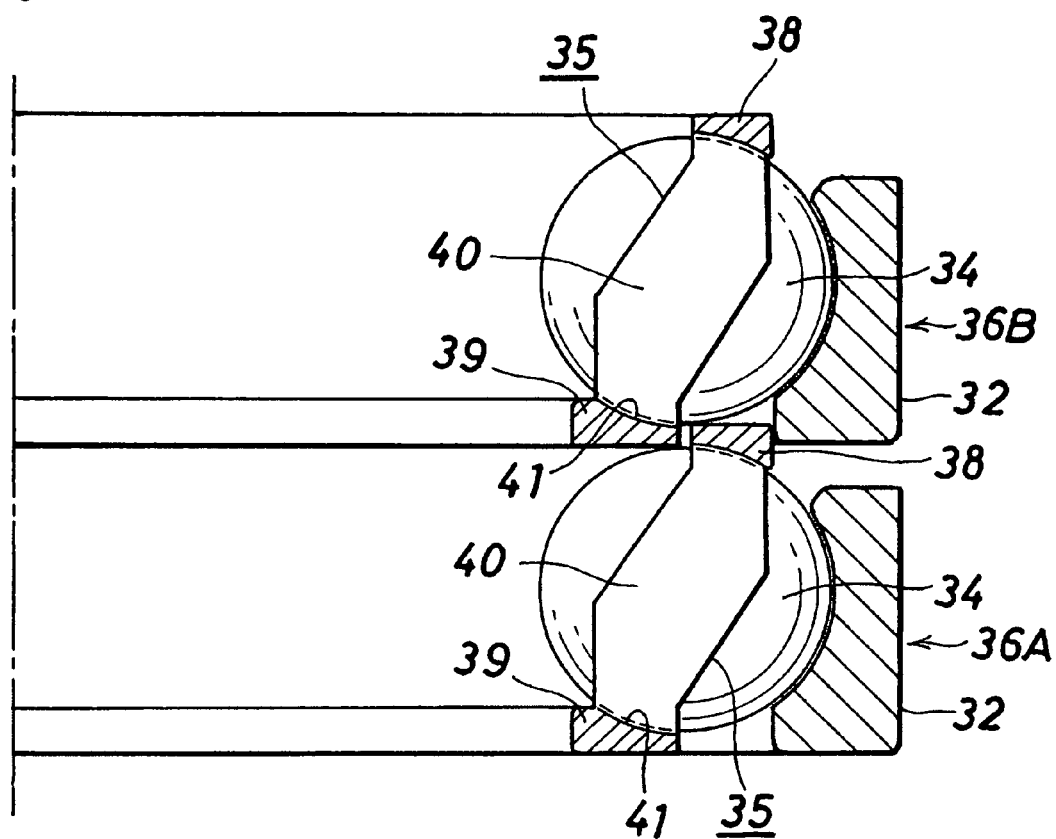
FIG. 7 is a vertical cross-sectional view of a related angular contact ball bearing.

As compared with the outer ring assemblies 36A and 36B shown in FIG. 7, with respect to the outer ring 2, the inner edge portion of the end surface of the counter bore opposite side end portion 2c (heretofore defined by the end surface and the cylindrical inner peripheral surface intersecting each other at right angles) is formed into the chamfered portion 2d. With respect to the cage 5, a largest-diameter annular portion 8a is added to the conventional larger-diameter annular portion 38 (which is defined by the end surface and the outer peripheral surface intersecting each other at right angles) to form the larger-diameter annular portion 8, and the outer edge portion (outer corner portion) of the end surface of the largest-diameter portion 8a is formed into the chamfered portion 8b.

When the outer ring assemblies 6A and 6B of this construction are stacked with the counter bore opposite side end portions 2c of their outer rings 2 directed downward, the outer ring 2 of the upper outer ring assembly 6B and the cage 5 of the lower outer ring assembly 6A contact each other at their superposition portions. Therefore, even when the upper outer ring assembly 6B is stacked on the lower outer ring assembly 6A in a slightly inclined condition relative to a horizontal position or in slightly eccentric relation to the lower outer ring assembly 6A, the larger-diameter annular portion 8 of the cage 5 of the lower outer ring assembly 6A will not fit into a gap between the inner periphery of the outer ring 2 and the smaller-diameter annular portion 9 of the cage 5 of the upper outer ring assembly 6B, and therefore the ability of taking the outer ring assembly out from the lower side of the stack of outer ring assemblies will not be adversely affected. And besides, the chamfered portions 8b and 2b are formed respectively at the corner portion (outer edge portion) of the end surface of the larger-diameter annular portion 8 of the cage 5 and the corner portion (inner edge portion) of the lower end surface of the outer ring 2, and therefore the corner portion of the cage 5 and the corner portion of the outer ring 2 will not catch on each other, and the lower outer ring assembly can be smoothly pulled out.

Second Embodiment

Figure 2:
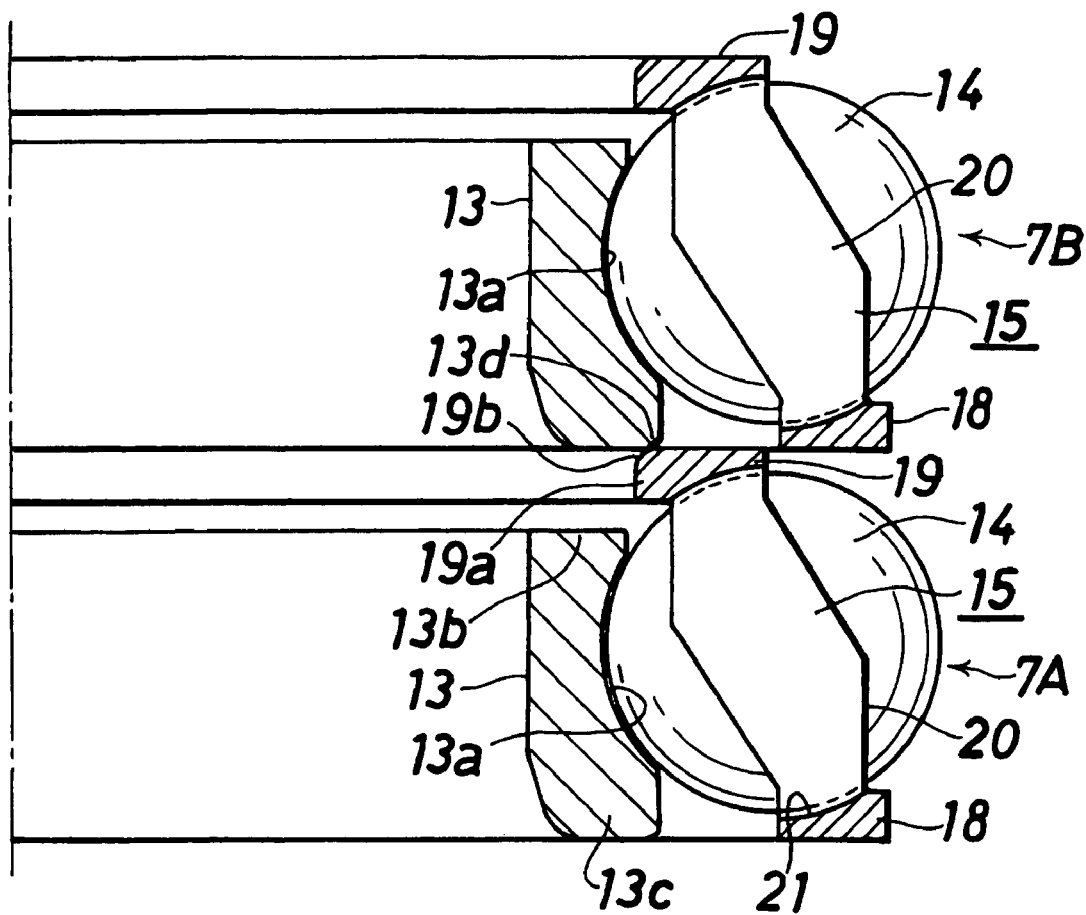
FIG. 2 is a vertical cross-sectional view showing a second embodiment of angular contact ball bearings of the invention.

FIG. 2 shows angular contact ball bearings according to a second embodiment of the invention. The angular contact ball bearing includes a conical type cage 15, and this cage 15 includes a larger-diameter annular portion 18, a smaller-diameter annular portion 19 spaced a predetermined distance from the annular portion 18 in an axial direction, and a plurality of inclined pillar portions 20 arranged at predetermined intervals in the circumferential direction and interconnecting the two annular portions 18 and 19. In order that a lightweight design can be achieved and also that inner ring assemblies 7A and 7B (each having balls 14 and the conical type cage 15 incorporated in an inner ring 13) of the angular contact ball bearings can be suitably stacked together, one end surface (upper end surface) of the inner ring 13 is disposed axially inwardly of (below) an end surface of the smaller-diameter annular portion 19 of the cage 15, and the other end surface (lower end surface) of the inner ring 13 is disposed flush with an end surface (lower end surface) of the larger-diameter annular portion 18 of the cage 15 in a stacked condition. An inner diameter of the smaller-diameter annular portion 19 of the cage 15 is smaller than an outer diameter of the lower end surface of the inner ring 13, and with this construction when the inner ring assemblies 7A and 7B are stacked together, an area of superposition corresponding to a half of the dimensional difference between the outer diameter of the lower end surface of the inner ring 13 and the inner diameter of the smaller-diameter annular portion 19 of the cage 15 is formed between the end surface of the smaller-diameter annular portion 19 of the cage 15 (of the lower inner ring assembly 7A) and the lower end surface of the inner ring 13 (of the upper inner ring assembly 7B) which are superposed together. Further, a chamfered portion 19b is formed at a corner portion (inner edge portion) of the end surface of the smaller-diameter annular portion 19 of the cage 15, and also a chamfered portion 13d is formed at a corner portion (outer edge portion) of the lower end surface of the inner ring 13. These chamfered portions 19b and 13d facilitate the taking-out of the inner ring assembly from the lower side of the stack of inner ring assemblies.

In FIG. 2, each of the inner ring assemblies 7A and 7B is assembled such that the balls 14 are mounted on a raceway surface 13a of the inner ring 13, and are retained by the cage 15 against disengagement from the raceway surface 13a. The balls 14 are fitted respectively in pockets 21 of the cage 15, and are prevented from withdrawal from the respective pockets 21.

The raceway surface 13a of the inner ring 13 is formed into a so-called counter bore type, and a diameter of an end portion (counter bore side end portion) 13b corresponding to the smaller-diameter annular portion 19 of the cage 15 is smaller than a diameter of an end portion (counter bore opposite side end portion) 13c corresponding to the larger-diameter annular portion 18 of the cage 15.

As compared with conventional inner ring assemblies, with respect to the inner ring 13, the outer edge portion of the end surface of the counter bore opposite side end portion 13c (heretofore defined by an end surface and a cylindrical outer peripheral surface intersecting each other at right angles) is formed into the chamfered portion 13d. With respect to the cage 15, a smallest-diameter annular portion 19a is added to the conventional smaller-diameter annular portion 39 (see FIG. 7) (which is defined by the end surface and the inner peripheral surface intersecting each other at right angles) to form the smaller-diameter annular portion 19, and the inner edge portion (inner corner portion) of the end surface of the smallest-diameter portion 19a is formed into the chamfered portion 19b.

When the inner ring assemblies 7A and 7B of this construction are stacked with the counter bore opposite side end portions 13c of their inner rings 13 directed downward, the inner ring 13 of the upper inner ring assembly 7B and the cage 15 of the lower inner ring assembly 7A contact each other at their superposition portions. Therefore, even when the upper inner ring assembly 7B is stacked on the lower inner ring assembly 7A in a slightly inclined condition relative to a horizontal position or in slightly eccentric relation to the lower inner ring assembly 7A, the smaller-diameter annular portion 19 of the cage 15 of the lower inner ring assembly 7A will not fit into a gap between the outer periphery of the inner ring 13 and the larger-diameter annular portion 19 of the cage 15 of the upper inner ring assembly 7B, and therefore the ability of taking the inner ring assembly out from the lower side of the stack of inner ring assemblies will not be adversely affected. And besides, the chamfered portions 19b and 13d are formed respectively at the corner portion (inner edge portion) of the end surface of the smaller-diameter annular portion 19 of the cage 15 and the corner portion (outer edge portion) of the lower end surface of the inner ring 13, and therefore the corner portion of the cage 15 and the corner portion of the inner ring 13 will not catch on each other, and the lower inner ring assembly can be smoothly pulled out.

Although the showing of an inner ring to be combined with each outer ring assembly 6A, 6B, as well as the showing of an outer ring to be combined with each inner ring assembly 7A, 7B, is omitted, the inner ring of any suitable shape and the outer ring of any suitable shape can be used. With respect to the outer ring 2 of each outer ring assembly 6A, 6B and the inner ring 13 of each inner ring assembly 7A, 7B, an outer ring of any other suitable shape and an inner ring of any other suitable shape can be used.

Third Embodiment

A third embodiment according to the present invention will be described with reference to FIGS. 3 and 4.

Figure 3:
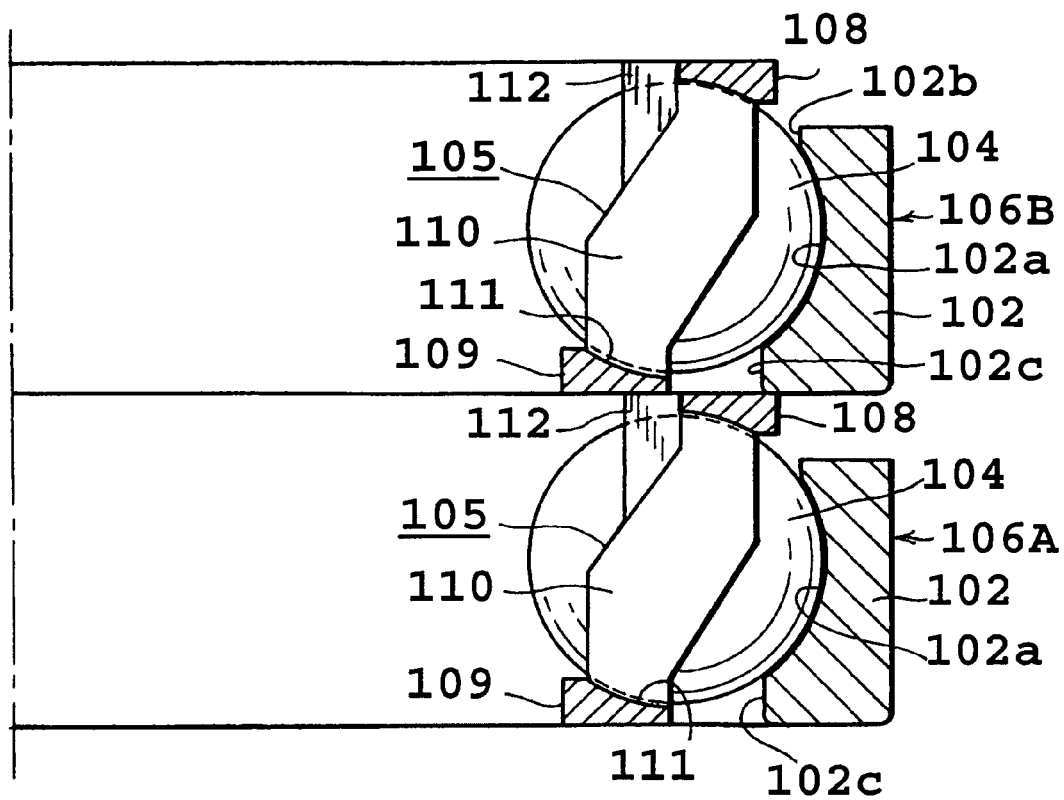
FIG. 3 is a vertical cross-sectional view showing a first embodiment of angular contact ball bearings of the present invention.
Figure 4:
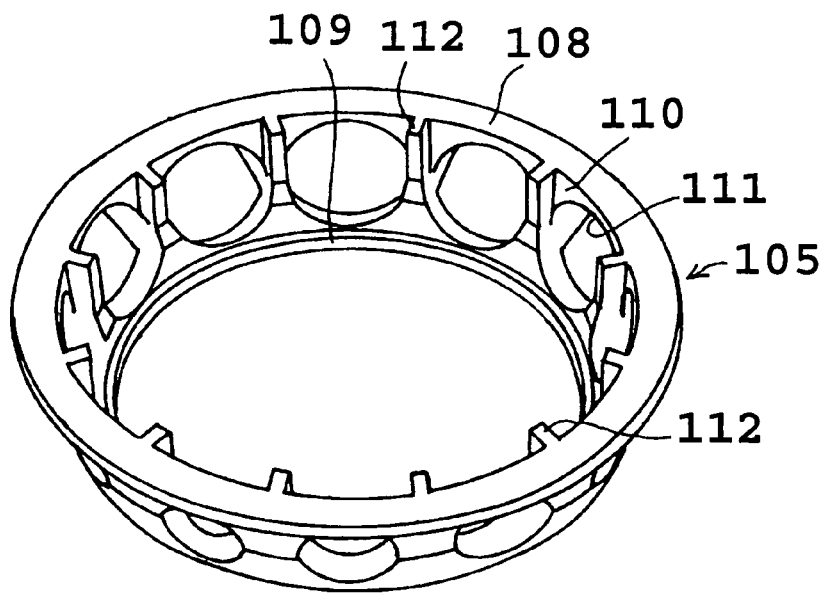
FIG. 4 is a perspective view of a cage of the angular contact ball bearing of the first embodiment.

In an angular contact ball bearing according to the third embodiment of the invention, one end surface (upper end surface) of an outer ring 102 is disposed axially inwardly of (below) an end surface of a larger-diameter annular portion 108 of a cage 105 as is the case with the above angular contact ball bearing 131, but the other end surface (lower end surface) of the outer ring 102 is disposed flush with an end surface (lower end surface) of a smaller-diameter annular portion 109 of the cage 105 in a stacked condition, as shown in FIG. 3. Further, a plurality of protruding portions 112 are formed on that portion of an inner peripheral surface of the cage 105 disposed adjacent to the end surface of the larger-diameter annular portion 108, and are arranged at predetermined intervals in the circumferential direction as shown also in FIG. 4.

In FIG. 3, each of outer ring assemblies 106A and 106B is assembled such that balls 104 are mounted on a raceway surface 102a of the outer ring 102, and are retained by the cage 105 against disengagement from the raceway surface 102a. The balls 104 are fitted respectively in pockets 111 of the cage 105, and are prevented from withdrawal from the respective pockets 111.

The raceway surface 102a of the outer ring 102 is formed into a so-called counter bore type, and a diameter of an end portion (counter bore side end portion) 102b corresponding to the larger-diameter annular portion 108 of the cage 105 is larger than a diameter of an end portion (counter bore opposite side end portion) 102c corresponding to the smaller-diameter annular portion 109 of the cage 105.

The plurality of protruding portions 112 are formed respectively at all of those portions of the cage 105 at which pillar portions 110 are formed, respectively. With this construction, an inner diameter of the end surface of the larger-diameter annular portion 108 of the cage 105 is substantially made small, and when the cages 105 are stacked together, the upper cage 105 will not fit deep into the lower cage 105.

When the outer ring assemblies 106A and 106B of this construction are stacked with the counter bore opposite side end portions 102c of their outer rings 102 directed downward, the counter bore opposite side end surface of the outer ring 102 of each outer ring assembly is disposed flush with the end surface of the smaller-diameter annular portion 109 of the cage 105, and therefore in this stacked condition the dead weight is received by both of the outer ring 102 and the cage 105. At this time, the plurality of protruding portions 112 of the cage 105 of the lower outer ring assembly 106A abut against the lower surface of the smaller-diameter annular portion 109 of the cage 105 of the upper outer ring assembly 106B, and the two cages 105 contact each other, so that the dead weight of the upper outer ring assembly 106B is received. Therefore, a load acting between the balls 104 and the raceway surface 102a of the outer ring 102 of the lower outer ring assembly 106A is small, and even when an impact load is applied during conveyance, brinelling (indentation) and damage are prevented from occurring on the raceway surface 102a of the outer ring 102.

The balls 104 are mounted respectively in the pockets 411 of the cage 105 by forcibly fitting the balls 104 into the respective pockets 111 from the outer periphery of the cage 105. The protruding portions 112 are formed on the portion of the inner peripheral surface of the cage 105 disposed adjacent to the larger-diameter end surface thereof, and therefore the protruding portions 112 will not interfere with this fitting operation.

Figure 8:
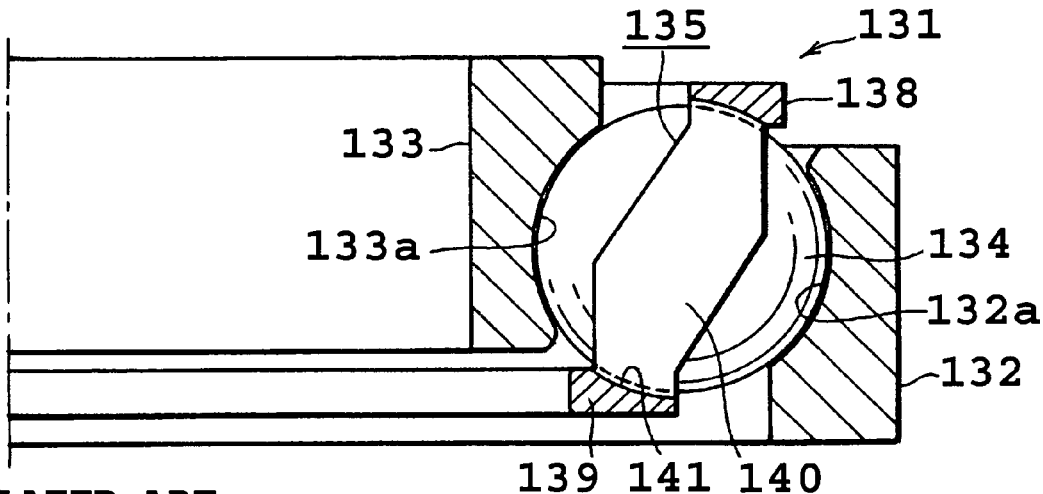
FIG. 8 is a vertical cross-sectional view of a related angular contact ball bearing.
Figure 9:
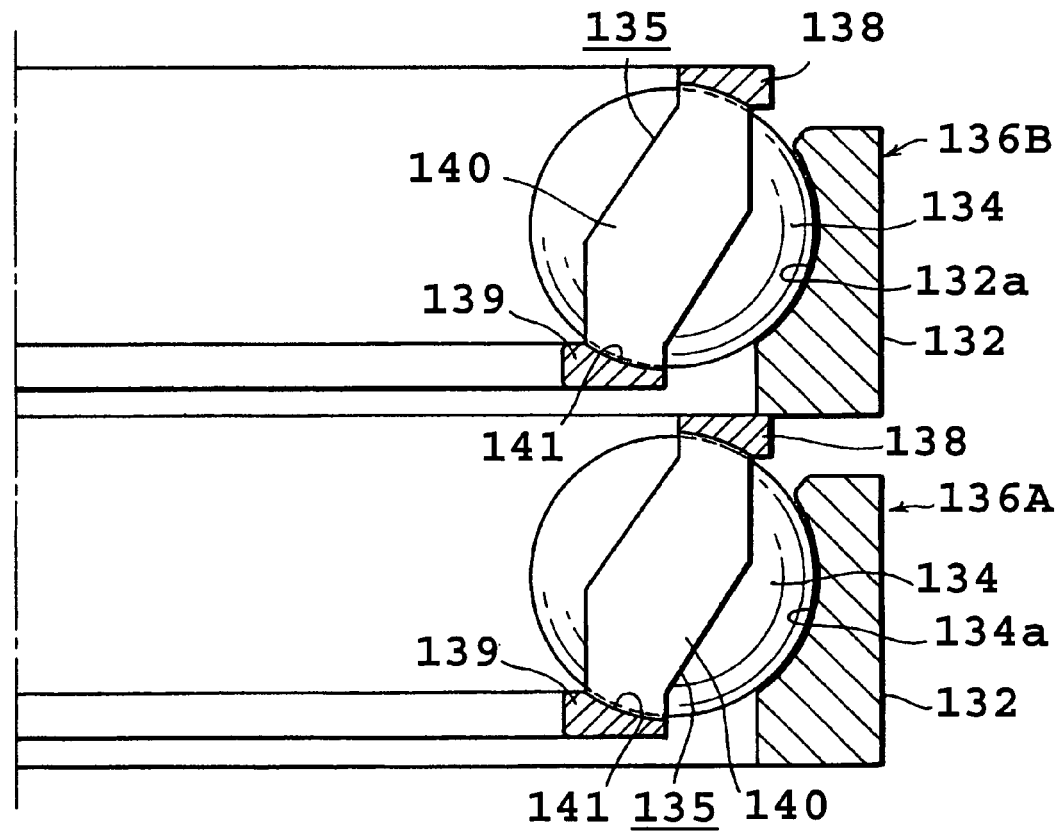
FIG. 9 is a view similar to FIG. 3, but showing the related angular contact ball bearings.

When inner ring assemblies of the angular contact ball bearings 131 of FIG. 8 are stacked together (In this stacked condition, the inner ring assembles are inverted with respect to the condition shown in FIG. 8), the upper inner ring assembly is placed on the cage 135 of the lower inner ring assembly in a similar manner to the stacked condition of FIG. 9, and a large load acts between the balls 134 and the raceway surface 133a of the inner ring 133 of the lower inner ring assembly. As a result, when an impact load is applied during conveyance, there is a possibility that brinelling (indentation) and damage occur on the raceway surface 133a of the inner ring 133.

Fourth Embodiment

Figure 5:
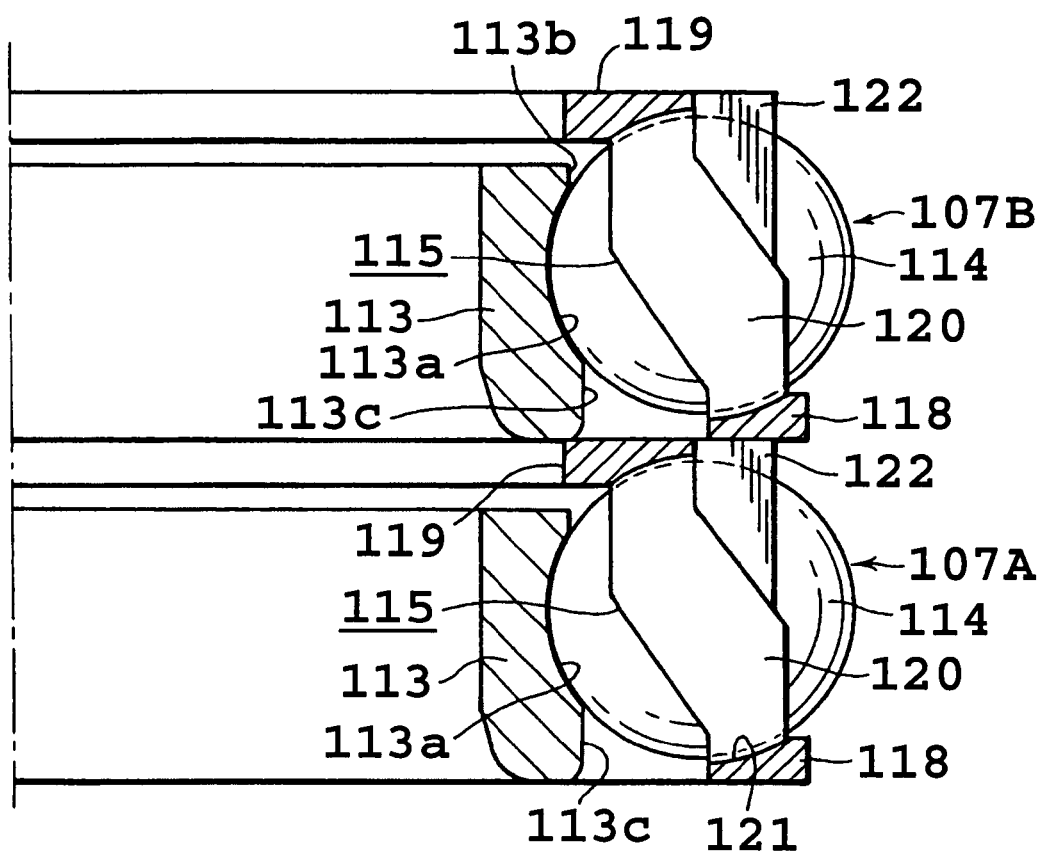
FIG. 5 is a vertical cross-sectional view showing a second embodiment of angular contact ball bearings of the invention.
Figure 6:
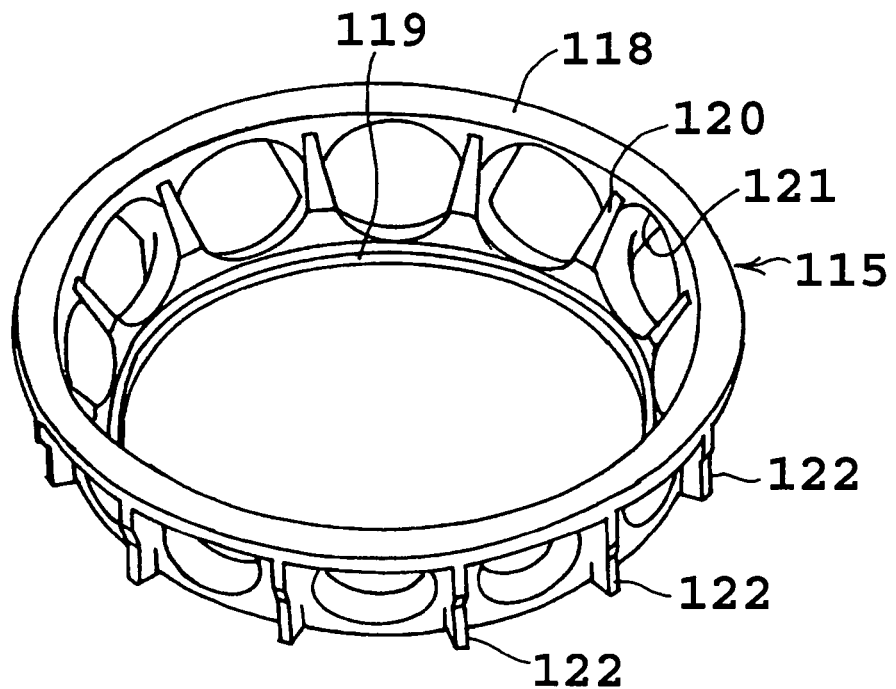
FIG. 6 is a perspective view of a cage of the angular contact ball bearing of the second embodiment.

Therefore, in an angular contact ball bearing according to a fourth embodiment of the invention, one end surface (upper end surface) of an inner ring 113 is disposed axially inwardly of (below) an end surface of a smaller-diameter annular portion 119 of a cage 115, and the other end surface (lower end surface) of the inner ring 113 is disposed flush with an end surface (lower surface) of a larger-diameter annular portion 118 of the cage 115 in a stacked condition as shown in FIG. 5. Further, a plurality of protruding portions 122 are formed on that portion of an outer peripheral surface of the cage 115 disposed adjacent to the end surface of the smaller-diameter annular portion 119, and are arranged at predetermined intervals in the circumferential direction as shown also in FIG. 6.

A raceway surface of the inner ring 113 is formed into a so-called counter bore type, and a diameter of an end portion (counter bore side end portion) 113b corresponding to the smaller-diameter annular portion 119 of the cage 115 is smaller than a diameter of an end portion (counter bore opposite side end portion) 113c corresponding to the larger-diameter annular portion 118 of the cage 115.

The plurality of protruding portions 122 are formed respectively at all of those portions of the cage 115 at which pillar portions 120 are formed, respectively. With this construction, an outer diameter of the end surface of the smaller-diameter annular portion 119 of the cage 115 is substantially made large, and when the cages 115 are stacked together, the upper cage 115 will not fit deep into the lower cage 115.

When inner ring assemblies 107A and 107B of this construction are stacked with the counter bore opposite side end portions 113c of their inner rings 113 directed downward, the counter bore opposite side end surface of the inner ring 113 of each inner ring assembly is disposed flush with the end surface of the larger-diameter annular portion 118 of the cage 115, and therefore in this stacked condition the dead weight is received by both of the inner ring 113 and the cage 115. At this time, the plurality of protruding portions 122 of the cage 115 of the lower inner ring assembly 107A abut against the lower surface of the larger-diameter annular portion 118 of the cage 115 of the upper inner ring assembly 107B, and the two cages 115 contact each other, so that the dead weight of the upper inner ring assembly 107B is received. Therefore, a load acting between balls 114 and the raceway surface 113a of the inner ring 113 of the lower inner ring assembly 107A is small, and even when an impact load is applied during conveyance, brinelling (indentation) and damage are prevented from occurring on the raceway surface 113a of the inner ring 113.

The angular contact ball bearing described above is merely one example to which the present invention can be applied, and the invention can be applied to any other suitable angular contact ball bearing.

What is claimed is:

1. An outer ring assembly for an angular contact ball bearing, comprising:
   an outer ring that includes a first end surface, a second end surface and a raceway surface;
   a plurality of balls disposed on the raceway surface;
   a cage that holds the balls and includes a third end surface and a fourth end surface, the third end surface comprising a diameter greater than a diameter of the fourth end surface;
   wherein the outer ring assembly accommodates another outer ring assembly stacked on the outer ring assembly in an assembled state that the balls and the cage are incorporated in the outer ring, wherein the first end surface of the outer ring is disposed axially inwardly of the third end surface of the cage, wherein, when the outer ring assembly is disposed with the second end surface of the outer ring directed downward, the second end surface of the outer ring and the fourth end surface of the cage are disposed flush with each other, and wherein a plurality of protruding portions, for abutting against an end surface of a cage of said another outer ring assembly when the outer ring assembly and said another outer ring assembly are stacked together, are formed on one of an inner peripheral surface of the cage adjacent to the third end surface of the cage and an outer peripheral surface of the cage adjacent to the fourth end surface of the cage and are arranged at a predetermined intervals.

2. An inner ring assembly for an angular contact ball bearing, comprising:

an inner ring that includes a first end surface, a second end surface and a raceway surface;

a plurality of balls disposed on the raceway surface;

a cage that holds the balls and includes a third end surface and a fourth end surface, the third end surface comprising a diameter greater than a diameter of the fourth end surface;

wherein the inner ring assembly accommodates another inner ring assembly stacked on the inner ring assembly in an assembled state that the balls and the cage are incorporated in the inner ring, wherein the first end surface of the inner ring is disposed axially inwardly of the third end surface of the cage, wherein, when the inner ring assembly is disposed with the second end surface of the inner ring directed downward, the second end surface of the inner ring and the fourth end surface of the cage are disposed flush with each other, and wherein a plurality of protruding portions, for abutting against an end surface of a cage of said another inner ring assembly when the inner ring assembly and said another inner ring assembly are stacked together, are formed on one of an outer peripheral surface of the cage adjacent to the third end surface of the cage and an inner peripheral surface of the cage adjacent to the fourth end surface of the cage and are arranged at a predetermined intervals.

* * * * *